US007532856B2

(12) United States Patent
Stoddard et al.

(10) Patent No.: US 7,532,856 B2
(45) Date of Patent: May 12, 2009

(54) REGENERATIVE JAMMER WITH MULTIPLE JAMMING ALGORITHMS

(76) Inventors: Robert Eugene Stoddard, 958 Chelan Dr., Sunnyvale, CA (US) 94087; John Lorin Anderson, 4991 Englewood Dr., San Jose, CA (US) 95129

( * ) Notice: Subject to any disclaimer, the term of this patent is extended or adjusted under 35 U.S.C. 154(b) by 515 days.

(21) Appl. No.: 11/398,748

(22) Filed: Mar. 24, 2006

(65) Prior Publication Data

US 2009/0061759 A1 Mar. 5, 2009

(51) Int. Cl.
*H04K 3/00* (2006.01)
*H04B 1/00* (2006.01)
*G01S 7/36* (2006.01)

(52) U.S. Cl. .............................. 455/1; 375/130; 342/14

(58) Field of Classification Search ..................... 455/1, 455/18, 73; 375/130, 147; 342/14, 15
See application file for complete search history.

(56) References Cited

U.S. PATENT DOCUMENTS 5,708,975 A * 1/1998 Heiskari et al. ............ 455/63.1
5,822,429 A * 10/1998 Casabona et al. ........... 380/252
6,476,755 B1 * 11/2002 Senio et al. ................... 342/15
6,757,324 B2 * 6/2004 Fitzrandolph ............... 375/147
7,126,979 B2 * 10/2006 Karlsson ..................... 375/130
2006/0264168 A1 * 11/2006 Corbett et al. ................. 455/1

* cited by examiner

*Primary Examiner*—Tilahun B Gesesse

(57) ABSTRACT

A jammer for generating and transmitting RF broadband jamming signals for jamming one or more local RF receivers. The jammer includes a broadband antenna unit for receiving broadband RF jammer received signals from local transmitters and for transmission of regenerated broadband RF jamming signals to the local receivers. The jammer uses a plurality of jamming algorithms including a regeneration algorithm and one or more alteration algorithms that alter the regenerated signals whereby the altered regenerated signals are asynchronous with respect to ones of, or all of, the jammer received signals. The alteration algorithms include a chopping algorithm and an FM modulation algorithm.

25 Claims, 9 Drawing Sheets

REGENERATIVE JAMMER WITH MULTIPLE JAMMING ALGORITHMS

TECHNICAL FIELD

The present invention relates to RF transmitters and receivers in environments where inhibiting of RF reception by local RF receivers is desired and further relates to RF jammers that jam local RF receivers thus preventing such local RF receivers from initiating transmissions by associated local RF transmitters or otherwise from initiating any action.

BACKGROUND OF THE INVENTION

RF transmitters and receivers have become widely available and deployed for use in many applications including many commercial products for individuals such as cell phones, garage door openers, automobile keyless entry devices, cordless phones and family radios. RF transmitters and receivers are also widely deployed in more complex commercial, safety and military applications. Collectively, the possible existence of many different RF transmissions from so many different types of equipment presents a broadband RF transmission environment.

In light of the increasing large deployment of many different types of RF transmitters and receivers, the particular RF signals and signal protocols that may be present in any particular local area potentially are quite complex.

At times in a particular local area, it is desirable that the RF local receivers be rendered temporarily inactive thus preventing such local RF receivers from initiating transmissions by any associated local RF transmitters or otherwise from initiating any action.

RF jammers have long been employed for temporarily rendering local RF receivers inactive. However, the large deployment of many different types of RF transmitters and receivers has rendered conventional jammers ineffective in a complex broadband RF environment.

Jamming is usually achieved by transmitting a strong jamming signal at the same frequency or in the same frequency band as that used by the targeted local receiver. The jamming signal may block a single frequency, identified as "spot jamming", or may block a band of frequencies, identified as "barrage jamming".

Although simple jammers have long existed, technological advances require the development of advanced jamming equipment. Early jammers were often simple transmitters keyed on a specific frequency thereby producing a carrier which interfered with the normal carriers at targeted local receivers. However, such single carrier jammers have become ineffective and easily avoided using, for example, frequency hopping, spread spectrum and other technologies.

Some jamming equipment has used wide-band RF spectrum transmitters and various audio tone transmissions to jam or to spoof local receivers. Other systems employ frequency tracking receivers and transmitters and utilize several large directional antenna arrays that permit directional jamming of targeted local receivers. Often in such arrays, deep nulls in selected directions are provided to minimize the effects of the jamming in those selected directions. The deep null directions are then used to allow wanted communications.

Some jammers feature several modes of operation and several modulation types. For example, such operational modes include hand keying, random keying, periodic keying, continuous keying and "look through". In the "look through" mode, a special jammer or a separate receiver/transmitter is used to selectively control the keying of the transmit circuit.

The "look through" mode can be configured to hard key the transmitter ON at full power output upon detection of a received signal and periodically hard switch the transmitter RF power to OFF. In unkey operations, while the receiver "looks through" to see if there is still a carrier present or, after the transmitter has hard keyed to full output power ON, the RF output of the transmitter is gradually slewed down to a lower level while the receiver "looks through" to detect any carrier activity on the targeted frequency.

In a continuous-wave operation, when a jammer is only transmitting a steady carrier, the jamming signal beats with other signals and produces a steady tone. In the case of single side band (SSB) or amplitude modulated (AM) signals, a howl sound is produced at the receiver. In the case of frequency modulated (FM) signals, the receiver is desensitized, meaning that the receiver's sensitivity (ability to receive signals) will be greatly reduced.

When various types of modulations are generated by a transmitter, the operation is referred to as "Modulated Jamming". The modulation sources have been, for example, noise, laughter, singing, music, various tones and so forth. Some of the modulation types are White Noise, White Noise with Modulation, Tone, Bagpipes, Stepped Tones, Swept Tones, FSK Spoof and Crypto Spoof.

The jammers that are actually deployed have tended to be either barrage jammers broadcasting broadband noise or CW (continuous wave) signals targeted at specific known signals. Generally, barrage jammers tend to produce a low energy density in any given communications channel, for example a 25 kHz channel, when jamming a broad band of channels. By way of example, a 200 MHz barrage jammer transmitting 100 Watts generally will only have 12 mWatts in any communications channel and this low power level per channel is likely to be ineffective as a jammer. These jammers also tend to jam wanted communications.

There is a class of jammers that record a brief sample of the signal environment, determine the frequencies of the active signals detected and allocate a jammer transmitter to each of the detected signals. CW signals are typically used as the jammer signals. These systems are limited by the number of transmitters available. In a dense signal environment such as found in urban areas, there are not enough transmitters available and the ones that are available tend to be set on existing signals so that typically no transmitters are available for new signals.

In general, there are two classes of signals to be jammed—analog and digital. The digital signals (for example, key fobs, some radios and cordless phones) require the digital bits in the start of message part of the signal to the targeted communication system to be altered enough to prevent the targeted communication system from recognizing the signal.

A typical analog signal is a family radio signal (FRS). Analog signals are more difficult to jam than digital signals. An FRS local receiver responds to incoming RF transmissions by breaking squelch. If anything is detected by the FRS local receiver (noise or signal), the receiver responds by breaking squelch. In some cases, the mere breaking of squelch by the FRS local receiver is a form of communications. At times, it is desired to render the FRS local receiver totally ineffective including preventing it from even breaking squelch. With current jammer systems, the jammer signal itself typically creates enough "signal" or "noise" to cause the FRS local receiver to break squelch and respond. In such a case, the jammer signal itself may cause the FRS local radio to react. Such reaction can be to cause an associated FRS local transmitter to begin transmitting or to cause some other unwanted action.

For FRS operation, two modes are considered: privacy code ON and privacy code OFF. With the privacy code turned ON, it is sufficient for the jammer to interfere with the signal characteristics to prevent squelch. There are various techniques that are effective against these systems. For example, with privacy code ON, the FRS local radio can be effectively jammed with a simple CW tone at the channel center frequency. With privacy code OFF, any energy in-band will break squelch. It is believed that currently there are no effective jammers known for this privacy code OFF mode.

The FRS radio with privacy code OFF is a simple narrowband FM communication system of the type that has been known for many years. In many such systems, such as radios and telephones, the voice signal on transmission is typically band limited to 300 Hz to 3000 Hz and then the band-limited signal is FM modulated and RF transmitted. The RF receivers operate to FM demodulate the received signal and send the demodulated signal to the speakers or other locations. Historically, any signal energy in the 300 Hz to 3000 Hz band will break squelch.

Modern FRS systems are designed so that the receiving radios will break squelch only when analog FM signals are in particular demodulated frequency bands. In operation, the receivers of such systems measure the energy in the receiver FM demodulator output in demodulated frequency bands, for example, from 1 to 3 kHz and from 5 to 7 kHz. For valid voice signals in such systems, there will be high energy in the 1 to 3 kHz band and very low energy in the 5 to 7 kHz band (since in such systems the 5 to 7 kHz band is filtered from the original transmitted message signal). If the ratio of the energy in these two bands (1 to 3 kHz band and 5 to 7 kHz band) is below a threshold, such FRS system radios are designed to assume that the signal energy is not a signal of interest and are designed not break squelch.

A common jammer technique used in the radar field is to capture an individual local transmitter signal for a short period of time, copy the captured signal as a regenerated signal and retransmit that regenerated signal a short period of time later. Such a "regenerative" jammer creates false radar targets that appear as real targets thereby confusing the radar local receivers. In U.S. Pat. No. 6,476,755, a jammer uses time-division multiplexing techniques that permit monitoring received RF local transmitter signals while, in a time-division multiplexing sense, concurrently transmitting RF signals to jam selected transmissions at local receivers. The time-division multiplexing alternately enables the jamming system receiver and transmitter with operation at a frequency higher than the Nyquist rate.

Radar jammers must have the regenerated jammer transmitted signals synchronized with the jammer received signals. The regenerated jammer transmitted signals must look like the original local transmitter signals, that is, look like the jammer received signals received from the local transmitters. The timing characteristics of the regenerated jammer transmitted signals must match, that is, must be synchronous with, the timing characteristics of the jammer received signals. In the case of radars, the jammer received signals and the regenerated jammer transmitted signals are in the form of pulses. The precise timing, structure, modulation and frequency of each regenerated jammer transmitted signal pulse, that is, the timing characteristics of the pulse, must be the same as the timing, structure, modulation and frequency of the jammer received signal pulse. With such precision in the timing characteristics, the regenerated jammer transmitted signals are said to be synchronous with the jammer received signals. When the regenerated jammer transmitted signals are synchronous with respect to the jammer received signals, the local receiver cannot tell the difference between the regenerated signal pulse and a pulse from a real radar target.

To achieve the required precision in timing characteristics for synchronism, each regenerated jammer transmitted signal pulse must be transmitted at exact times after the jammer received signal pulse. If the received radar signal does not have a constant radar pulse repetition interval (PRI), the regenerated signal cannot have a constant PRI. The regenerated PRI must, to a good approximation, match the received signal PRI. Additionally, the jammer system must capture the entire local transmitter pulse. If the regenerated transmitted signal pulse is a fraction of the jammer received signal pulse, the jamming signal transmitted to the local receiver will appear corrupted and effective jamming will not occur.

In general, the operation of the radar jamming signals of the type described requires regeneration of false target pulses that through precise timing, structure, modulation and frequency appear to be true target pulses which confuse the local receivers to the point where the local receivers will not recognize and act on the received jamming signals.

Notwithstanding the advancements that have been made in jamming systems, the broadband RF transmission environment, particularly as it exists as a result of the proliferation of many different types of RF transmitters and receivers, presents a demanding need for more effective jammers.

In light of the foregoing background, there is a need for improved transmitters, receivers and jammers that are effective in local areas, and in particular are effective for RF broadband environments.

SUMMARY OF THE INVENTION

The present invention is a jammer for generating and transmitting RF broadband jamming signals for jamming one or more local RF receivers. The jammer includes a broadband antenna unit for receiving broadband RF jammer received signals from local transmitters and for transmission of regenerated broadband RF jamming signals to the local receivers. The antenna unit includes a transmit/receive antenna, with a transmit/receive switch for alternating between transmit and receive modes, or includes separate transmit and separate receive antennas. The jammer includes a receive-unit for receiving RF signals from local transmitters and a transmit-unit for transmitting RF signals for local receivers. A control unit controls generating the jamming signals using a plurality of jamming algorithms including a regeneration algorithm and one or more alteration algorithms. The RF jamming signals jam local receivers and prevent the local receivers from taking any action.

The regeneration algorithm samples the jammer received signals to form jammer regenerated signals. One or more alteration algorithms alter the jammer regenerated signals and the jammer regenerated signals are not required to match the timing characteristics of the jammer received signals whereby the altered jammer regenerated signals are asynchronous with respect to ones of, or all of, the jammer received signals and the timing characteristics of the RF jammer transmitter signals are independent of the timing characteristics of the jammer received signals. The alteration algorithms include, for example, a chopping algorithm and an FM modulation algorithm. These algorithms are used in various combinations. One combination includes regeneration and chopping, another combination includes regeneration and FM modulation and still another combination includes regeneration, chopping and FM modulation.

In the regeneration algorithm, the received signals from local transmitters are processed to form digital regenerated signals.

In the chopping algorithm, the digital regenerated signals are chopped to form chopped digital regenerated jamming signals.

In the FM algorithm, the digital regenerated signals are FM modulated to form FM modulated regenerated jamming signals.

In operation, the regeneration algorithm includes a non-transmit period for turning off the jammer transmitter signals and for enabling receipt of the jammer received signals, includes a record period, "N", occurring during the non-transmit period, for recording a sample of the jammer received signals and includes a playback period to play back the sample.

In operation, the chopping algorithm has an ON/OFF sequence including a Playback Period, "M", an OFF Period, "P" and a number of playbacks, "R" of the ON/OFF sequence.

The control unit includes logic for controlling the sequencing in response to the N. M, P and R values and these values do not match the timing characteristics of the jammer received signals.

The jamming system of the present application, as distinguished from known jammers, records and plays back the regenerated received signals without needing to precisely match the timing, structure, modulation and frequency of the received signals. The timing, for example, includes hop, burst and bit timing. The structure, for example, includes Time Division Multiple Access (TDMA), Code Division Multiple Access (CDMA), framing and sub-framing. The modulation, for example, includes On/Off Keying (OOK), Frequency Shift Keying (FSK) and Phase Shift Keying (PSK). The frequency, for example, includes frequency hopping such as occurs in Blue Tooth and GSM systems.

The jammers of the present application do not require the regenerated jammer signals to match the timing characteristics of the jammer received signals, and hence, the regenerated jammer signals operate asynchronously with respect to any ones of, or all of, the local transmitter signals which are detected as the jammer received signals by the jamming system.

In one embodiment, the FM algorithm is implemented using an FM modulator for modulating the RF jammer transmitter signals with an FM signal. The FM modulation provides energy in the demodulated frequency bands, for example, in the 1 to 3 kHz band and in the 5 to 7 kHz band.

The foregoing and other objects, features and advantages of the invention will be apparent from the following detailed description in conjunction with the drawings.

DETAILED DESCRIPTION

Figure 1:
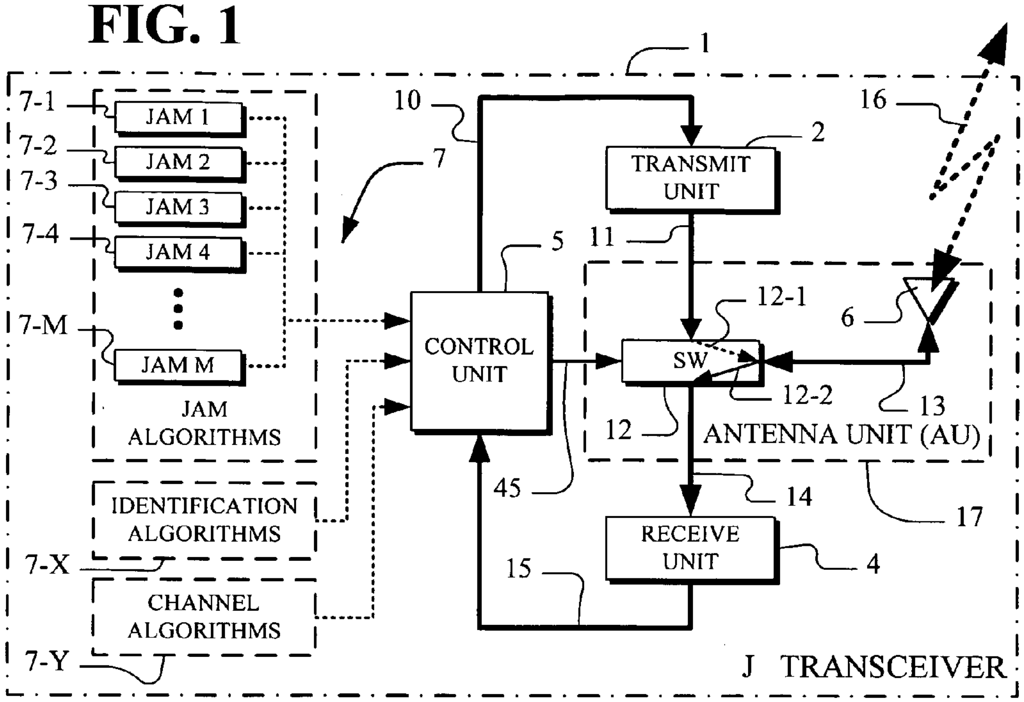
FIG. 1 depicts a schematic block diagram of a multiple-algorithm jammer having digital and analog algorithms.

In FIG. 1, the regenerative jammer 1 with multiple jamming algorithms includes a transmit-unit 2, a receive-unit 4 and an antenna unit 17. A control unit 5 controls the transmit-unit 2 and the receive-unit 4 to receive and process RF transmissions from local RF transmitters and to generate and transmit jammer signals to local RF receivers through antenna unit 17. The control unit 5 implements multiple control algorithms 7 including jamming algorithms 7-1, 7-2, . . . , 7-M. The jamming algorithms include a regeneration algorithm, a chopping algorithm and an FM modulation algorithm that are used in various combinations. One combination includes regeneration and chopping and another combination includes regeneration and FM modulation.

In one embodiment, the signals from transmitters in the local area of the jammer 1 are recorded, the recorded signals are chopped and repeated and the chopped and repeated signals are FM modulated. In some embodiments the control unit 5 also includes other control algorithms 7 such as identification algorithms 7-X for identifying local transmitters and channel algorithms 7-Y for maintaining open communications in selected channels in spite of the jamming operations of the jammer 1.

In FIG. 1, the transmit-unit 2 and the receive-unit 4 in an embodiment that operates from DC up to about 500 MHz is formed using analog/digital (A/D) and digital/analog (D/A) converters. In such an embodiment, the transmit-unit 2 uses an 8 bit, 1.5 MHz sample rate D/A converter and transmits in the DC to 500 MHz band. Similarly, the receive-unit 4 uses an 8-bit, 1.5 MHz sample rate A/D converter that records the received signal spectrum from DC to 500 MHz. The DC to 500 MHz band typically includes most of the local transmitters of interest in many local regions.

In order to provide greater dynamic range than is available from an 8-bit A/D converter and to provide greater frequency selectivity, a larger number of bits are employed for A/D and D/A converters. For example, 12-bit A/D and D/A converters with 70 MHz bandwidth are employed to provide greater dynamic range and to allow high-energy, low-priority bands (such as FM stereo, TV, etc.) to operate un-jammed.

In one preferred embodiment, the antenna unit 17 includes a single broadband transmitter/receiver antenna 6 which functions to both transmit and receive broadband RF signals. In FIG. 1, a switch 12 functions to switch between the transmit-unit 2 connection 12-1 to the line 11 output from the transmit-unit 2 (transmit path) and the receive-unit 4 connection 12-2 to the line 14 input to receive-unit 4 (receive path) under control of a switch signal on line 45 from control unit 5. In other embodiments, separate transmit and receive antennas (not shown) can be employed and connected directly to the transmit-unit line 11 and the receive-unit line 14, respectively, without need to be switched by a switch 12. In such an embodiment, however, switches may be employed to turn off the transmission periodically so as not to interfere with reception by a receive antenna and so as not to transmit "noise" when the regenerated chopped signal is OFF.

In FIG. 1, the jamming transmission from the jammer 1 includes an RF jamming signal 16 generated using a plurality of jamming algorithms 7-1, 7-2, . . . , 7-M. In one embodiment, the jamming algorithms include a first algorithm (JAM 1) 7-1 for generating a broadband regenerative jamming signal, a second algorithm (JAM 2) 7-2 for generating a chopped jamming signal and a third algorithm (JAM 3) 7-3 for generating an FM modulated jamming signal. The jamming transmission from the jammer 1 thus constituted includes both analog and digital components for jamming local receivers that are analog or digital in operation while allowing wanted communications to transmit unencumbered in the jamming region.

In FIG. 1, the first algorithm (JAM 1) 7-1 for generating a broadband regenerative jamming signal for digital receivers operates by receiving a broadband signal through antenna 6. With switch 12 in the 12-2 position, the RF jammer received signals from the RF transmissions of local receivers on line 13 are connected to line 14 for down conversion in the receive-unit 4 to provide converted received signals on line 15. The converted received signals on line 15 are recorded as broadband received signals in the control unit 5. The broadband recorded signals are then periodically processed as generated signals on line 10 so that the broadband received signals themselves become their own jammers. The generated signals on line 10 are up converted to RF jammer transmitter signals on line 11 and are connected through switch 12 in the 12-1 position to line 13 and antenna 6 for RF transmission to local receivers.

In FIG. 1, the second algorithm (JAM 2) 7-2 for generating a broadband jamming signal for digital receivers operates on the broadband recorded signals in control unit 5 so that the generated signals on line 10, previously described, are interspersed with pauses that represent an on/off rate of typically between 500 Hz to 5000 Hz. In operation, the broadband recorded signals in the control unit 5 are recorded for a short period of time from the converted received signals and then after that short period the broadband recorded signals are repeatedly formed as the generated signals thereby creating generated signals on line 10 as chopped signals that are very similar to the converted received signals. The generated signals on line 10, in the form of chopped signals, are up converted to RF jammer transmitter signals on line 11 and are connected through switch 12 in the 12-1 position to line 13 and antenna 6 for RF transmission to local receivers.

In FIG. 1, the algorithm (JAM 3) 7-3 for generating a broadband jamming signal for analog receivers operates on the broadband recorded signals in control unit 5 so that the generated signals on line 10, previously described, are modulated with an analog component. The analog component relies on the premise that there will be high energy in the 1 to 3 kHz band and very low energy in the 5 to 7 kHz band for any modern FRS system radio. The FM analog component inserts energy into both the 1 to 3 kHz band and into the 5 to 7 kHz band. Accordingly, the ratio of the energy in these two bands (1 to 3 kHz band and 5 to 7 kHz band) will be below a threshold in any local FRS system radio and hence the radio will not break squelch and will be jammed. In one embodiment, the local oscillator is frequency modulated (FM) with a frequency deviation of about 6.5 kHz sinusoidally at a rate of about 4 kHz to effectively insert energy into both the 1 to 3 kHz band and into the 5 to 7 kHz band. Any other modulation in addition to FM modulation, such as phase modulation (PM), that injects energy into the 5 to 7 kHz band can be employed.

In FIG. 1, the generated signals on line 10, in the form of chopped signals, are up converted to RF jammer transmitter signals with the inserted FM modulation on line 11 and are connected through switch 12, in the 12-1 position, to line 13 and antenna 6 for RF transmission to local receivers. The RF jammer transmitter signals include an analog algorithm, in the form of FM modulation, for preventing local receivers from receiving analog signals and include a digital algorithm, in the form of chopped regenerated signals, for preventing local receivers from receiving digital signals. Together the multiple analog and digital jamming algorithms have proved in actual practice to perform extraordinarily well and have been able to reliably jam receivers that have heretofore not been readily jammed.

Figure 2:
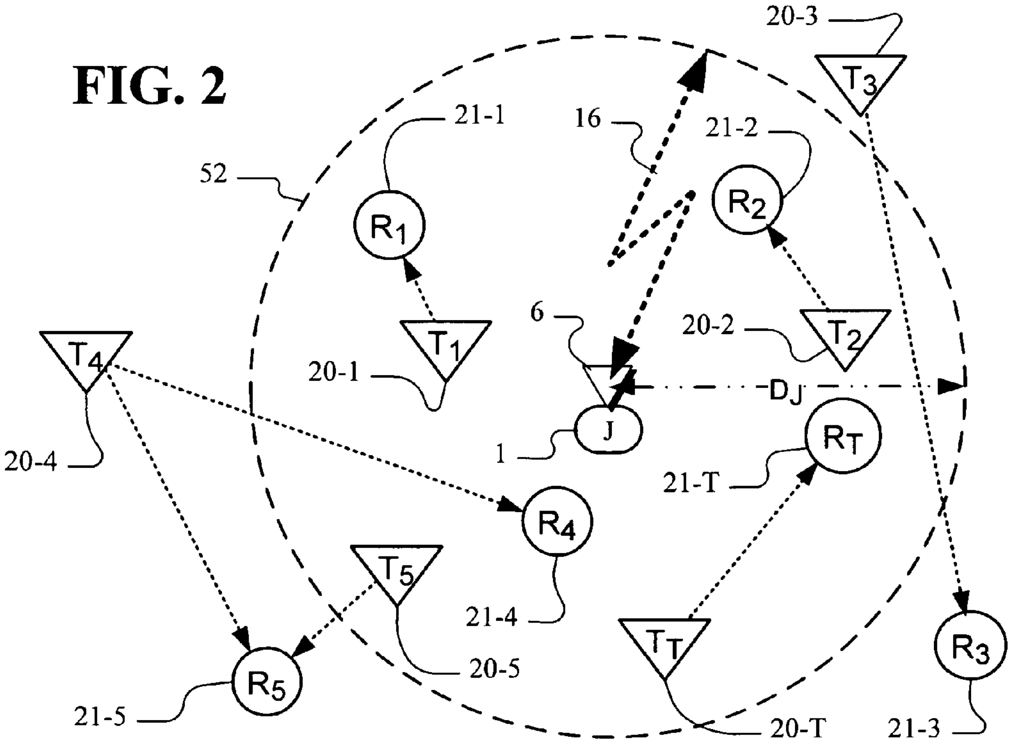
FIG. 2 depicts a local area with multiple local transmitters and local receivers that are within the RF radiation range of the jammer of FIG. 1.

In FIG. 2, the jammer 1 of FIG. 1 is located in a local region 52 having a plurality of RF local transmitters $T_1, T_2, \ldots, T_T$ designated 20-1, 20-2, . . . , 20-T, respectively, and having a plurality of RF local receivers $R_1, R_2, \ldots, R_T$ designated 21-1, 21-2, . . . , 21-T, respectively. Typically, the local transmitters $T_1, T_2, \ldots, T_T$ have RF transmissions to the local receivers $R_1, R_2, \ldots, R_T$, respectively. However, in some instances, a local transmitter can transmit to one or more additional receivers as shown, by way of example, with transmitter $T_4$ transmitting to both receivers $R_4$ and $R_5$.

In FIG. 2, the jammer 1 has an effective range of transmission $D_J$ where typically $D_J$ is an omni-directional pattern defined by a circle where radius $D_J$. In a typical example, the circle has a 100m radius. Of course, the shape and distance of the effective transmission range is controlled by the type of and radiation power of the antennas employed for RF transmission. Similarly, the effective transmission range of the local transmitters $T_1, T_2, \ldots, T_T$ is determined by the radiation power of and the type of antennas employed for the local transmitters.

In FIG. 2, the receivers $R_1$, $R_2$, $R_4$ and $R_T$ are within the $D_J$ range of the jammer 1 while receivers $R_3$ and $R_5$ are beyond the effective range of the jammer 1. Similarly, the local transmitters $T_1, T_2, \ldots, T_T$ may be located within or beyond the effective range of transmission $D_J$. However, the jammer 1 has an effective range for receiving transmissions from the local transmitters $T_1, T_2, \ldots, T_T$ which typically may be greater than the $D_J$ transmission range. The jammer 1 effectively operates to receive any signal that any of the in-range receivers $R_1$, $R_2$, $R_4$ and $R_T$ are able to receive from the local transmitters $T_1, T_2, \ldots, T_T$. Accordingly, the term "local area" as applied to the local transmitters means the area in which local transmitters are located such that the signals from those local transmitters can be effectively received by the local receivers in the $D_J$ transmission range. In operation, when the jammer 1 is turned ON for jamming, the in-range receivers $R_1$, $R_2$, $R_4$ and $R_T$ are jammed by the jamming transmission from the jammer 1.

Figure 3:
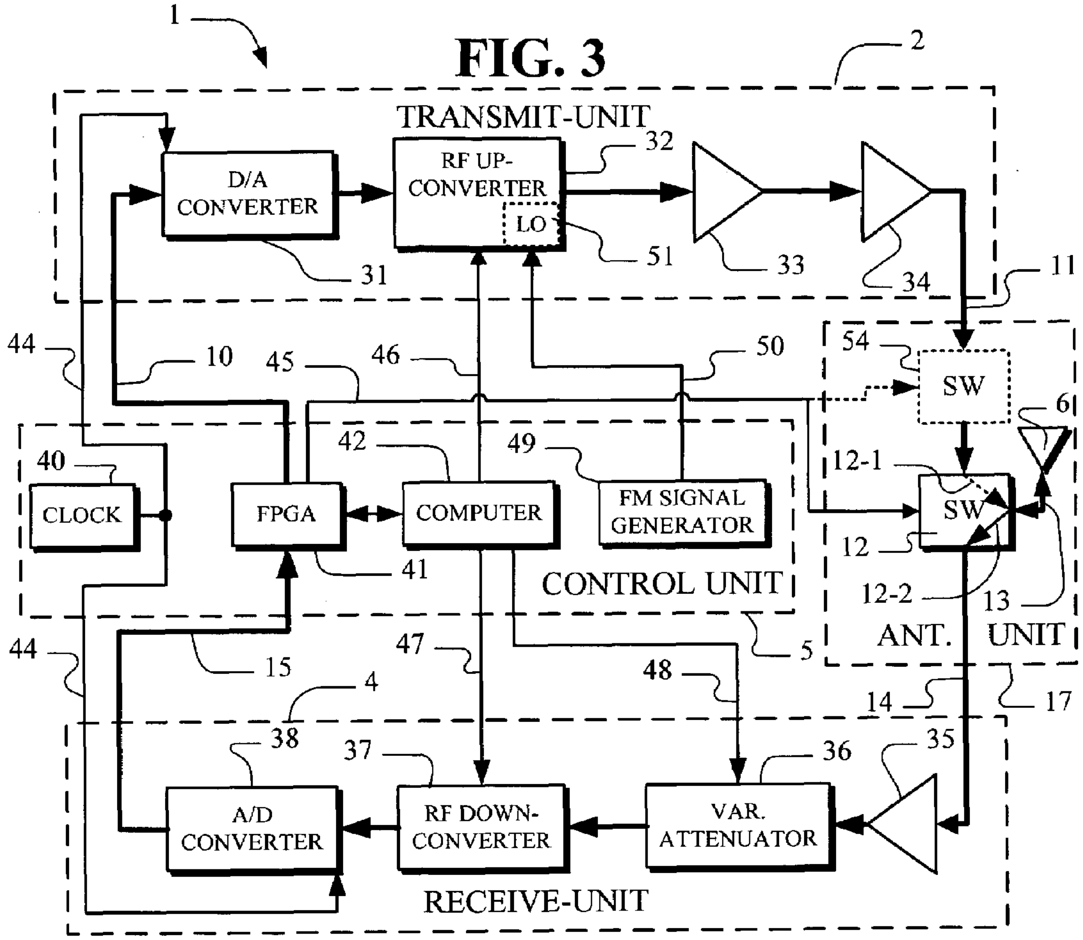
FIG. 3 depicts a further detailed embodiment of the jammer of FIG. 1.

In FIG. 3, further details of the multiple algorithms jammer 1 are shown. The jammer 1 includes an transmit-unit 2, a receive-unit 4 and an antenna unit 17. A control unit 5 controls the transmit-unit 2 and the receive-unit 4 to receive and process RF transmissions from local RF transmitters, such as transmitters local transmitters $T_1, T_2, \ldots, T_T$ in FIG. 2, and to generate and transmit jammer signals to local receivers, such as local receivers $R_1, R_2, \ldots, R_T$ in FIG. 2, through antenna unit 17. The control unit 5 is under control of multiple control algorithms 7 as described in connection with FIG. 1.

In FIG. 3, transmit-unit 2 includes a D/A CONVERTER 31 that receives the generated digital signal on line 10 and converts the generated digital signal to an analog signal as an input to the RF UP-CONVERTER 32. The RF UP-CONVERTER 32, controlled by an input on line 46 from control unit 5, converts the lower frequency analog signal from D/A CONVERTER 31 to an RF generated signal. The RF UP-CONVERTER 32 also receives the FM modulation signal on line 50 and the modulated output from the RF UP-CONVERTER 32 is amplified in amplifiers 33 and 34, including one or more amplifiers as is necessary to obtain the desired amplification, to provide the RF jammer transmitter signals on line 11 as an input to the antenna unit 17. The RF jammer transmitter signals on line 11 are connected by switch 12 to the antenna 6 and transmitted to the local receivers within the range of jammer 1. In the example of FIG. 2, the in-range receivers are the receivers $R_1$, $R_2$, $R_4$ and $R_T$ located within the $D_J$ range of the jammer 1.

In FIG. 3, receive-unit 4 includes an amplifier 35, including one or more amplifiers as is necessary to obtain the desired amplification, that amplifies the RF jammer receiver signals on line 14 received through switch 12 and antenna 6. The output from the amplifier 35 is input to VAR. ATTENUATOR 36 which operates, under control of an input 48 from control unit 5, to vary the attenuation of the RF jammer receiver signals which are derived from transmitters, such as local transmitters $T_1, T_2, \ldots, T_T$ in FIG. 2, with widely varying power levels. The output from the VAR. ATTENUATOR 36 is down converted in the RF DOWN-CONVERTER 37. The RF DOWN-CONVERTER 37, controlled by an input on line 47 from control unit 5, converts the RF jammer receiver signals to lower frequency jammer receiver signals that are digitized in the A/D CONVERTER 38 to form digital received signals on line 15 connected as an input to control unit 5.

As shown in FIG. 3, the control unit 5 of FIG. 1 includes a clock unit 40 for clocking the D/A CONVERTER 31 and the A/D CONVERTER 38 via line 44. A typical clock rate is typically 210 Msamples per second. The control unit 5 includes a field programmable gate array (FPGA) 41 which receives the digital received signals on line 15 and provides the digital generated signals on line 10. A typical FPGA is manufactured by Xilinx, model Virtex-4.

As shown in FIG. 3, the control unit 5 of FIG. 1 includes a computer 42 which controls the FPGA 41, the RF UP-CONVERTER 32 and the RF DOWN-CONVERTER 37. An conventional computer is suitable for computer 42 and typically is one having an Intel Pentium processor. The program executed by the computer 42 is routine and performs simple functions useful in controlling the operation of the jammer 1. The simple functions of the computer 42 include turning the system on/off, tuning the up/down converters 32 and 37, setting the timing values N, M, P and R and setting the variable attenuator 36. Alternatively, these functions are performed by the FPGA 41 and in such an embodiment; the computer 42 is not required.

As shown in FIG. 3, the control unit 5 of FIG. 1 includes an FM signal generator 49 that operates to modulate the local oscillator 51 of the RF UP-CONVERTER 32 with a frequency deviation of about 6.5 kHz sinusoidally at a rate of about 4 kHz to effectively insert energy into both the 1 to 3 kHz band and into the 5 to 7 kHz band of the RF jammer transmitter signals. In an alternate embodiment, the FM signal generation can be performed in the FPGA 41.

In FIG. 3, the first algorithm (JAM 1) 7-1 for generating a broadband regenerative jamming signal for digital receivers operates by receiving a broadband signal through antenna 6. With switch 12 in the 12-2 position, the RF jammer received signals, from the RF transmissions of local transmitters, such as local transmitters $T_1, T_2, \ldots, T_T$ in FIG. 2, on line 13 are connected to line 14 for down conversion in the receive-unit 4 to provide converted received signals on line 15. The converted received signals on line 15 are recorded as broadband received signals in the control unit 5 by the FPGA 41 in cooperation with the computer 42. The received broadband recorded signals are then periodically processed by the FPGA 41 in cooperation with the computer 42 to form the generated signals on line 10 so that the broadband received signals themselves become their own jammers.

Figure 4:
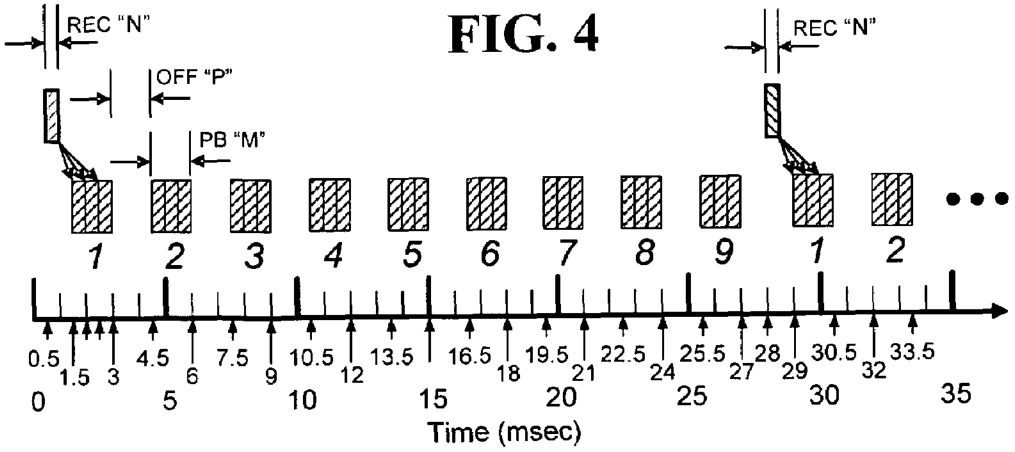
FIG. 4 depicts representative digital pattern of the chopped regenerated jamming signal produced by the jammer of FIG. 3.

In FIG. 4, a typical pulse pattern is shown that results from the digital processing of the broadband recorded signals when a combination of a regeneration algorithm and a chopping algorithm is employed. In FIG. 4, the different timing values are identified in the following TABLE 1.

TABLE 1

| | | |
|---|---|---|
| N | Record Period | 0.5 msec |
| M | Playback Period | 1.5 msec |
| P | OFF Period | 1.5 msec |
| R | Burst Playback Number | 9 |

The processing is performed by the FPGA 41 in cooperation with the computer 42. The general operation of the FPGA 41 is outlined in TABLE 2.

TABLE 2

| | |
|---|---|
| a | Receive and store data sample for N seconds |
| b | Playback the data samples for M seconds and if M > N, repeat the recorded samples as needed to fill M seconds. |
| c | Turn off signal for P seconds |
| d | Repeat the playback and turn-off steps b. and c. R times. |
| e | Repeat steps a. through d. continuously |

In FIG. 4, the received broadband signals are periodically sampled and stored by the FPGA 41. A first non-transmit period occurs between 0 and 1.5 msec. A first sample during the REC "N" period is made during the non-transmit period between 0.5 and 1 msec. That sample is then replayed three times at 1.5, 2.0 and 2.5 msec so that a 1.5 msec burst for burst 1 of the generated signal occurs between 1.5 and 3 msec, that is, for an ON PB "M" period of 1.5 msec of the ON/OFF chopping algorithm sequence. The generated signal is then turned OFF for the 1.5 msec OFF "P" period that occurs between 3 and 4.5 msec of the ON/OFF chopping algorithm sequence. Thereafter, the same information in burst 1 of the ON/OFF chopping algorithm sequence is repeated as burst 2, burst 3, burst 4, burst 5, burst 6, burst 7, burst 8 and burst 9, each burst having a 1.5 msec ON PB "M" period of 1.5 msec and each having an intervening 1.5 msec OFF "P" period. In FIG. 4, the burst playback number, R, of the ON/OFF chopping algorithm sequence is nine. In general, the value of R is any integer greater than 0 where R indicates that the ON/OFF sequence is played a number of times, R, to form the chopped regenerated signal.

In FIG. 4, after processing of the first nine bursts based upon the first recorded sample recorded during the REC "N" period between 0.5 and 1 msec, a new sample is recorded during the REC "N" period between 28 and 28.5 msec which occurs during a non-transmission period from 27-29 msec and thereafter a new burst sequence with a burst playback number of R equal to nine occurs generating burst 1, burst 2, . . . , burst 9 based upon the new sample, each burst having a 1.5 msec ON PB "M" period and each having an intervening 1.5 msec OFF "P" period. The repeated sampling and retransmitting of the sampled signals as indicated in FIG. 4 implements a regenerative algorithm where the generated signal is based upon the received signal as a result of the recorded samples at the REC "N" periods. Further, by introducing the OFF "P" periods between the regenerated ON PB "M" periods the burst 1, burst 2, . . . , burst 9, form a the digital chopped regenerated signal.

In FIG. 3, the chopping by the OFF "P" periods implements the second algorithm (JAM 2) 7-2 (see FIG. 1) for generating a chopped broadband jamming signal for digital receivers. In FIG. 3, the OFF "P" periods occur at a data rate of approximately 666 Hz which is within the target range of from 500 Hz to 5000 Hz. Of course, other frequencies within the 500 Hz to 5000 Hz range can be employed. Such a chopped signal has been found to be particularly effective for jamming receivers of On/Off Keying (OOK) communications systems.

Another embodiment that has been found particularly effective for forming the chopped regenerated signals is a modification of the FIG. 4 timing as indicated in the following TABLE 3.

TABLE 3

| | | |
|---|---|---|
| N | Record Period | 1.3 msec |
| M | Playback Period | 1.5 msec |
| P | OFF Period | 0.2 msec |
| R | Burst Repetitions | 6 |

The chopped generated signal on line 10 is converted from a digital signal to a baseband analog signal by the D/A CONVERTER 31. The baseband analog signal from the D/A CONVERTER 31 is then up-converted in the RF-UP-CONVERTER 32 to the RF band generated signal. The RF-UP-CONVERTER 32 uses the local oscillator 51 in the up-conversion.

In FIG. 3, the algorithm for generating a broadband jamming signal for analog receivers uses the local oscillator 51 (to implement the (JAM 3) algorithm of FIG. 1) to modulate the generated signals with an FM analog-generated component. The analog-generated component uses the local oscillator 51 to frequency modulate the generated signal from D/A CONVERTER 31 with a frequency deviation of about 6.5 kHz sinusoidally at a rate of about 4 kHz. Such modulation inserts energy into both the 1 to 3 kHz band and into the 5 to 7 kHz band. The generated signals from the RF-UP-CONVERTER 32 are amplified in the amplifiers 33 and 34 to provide the RF generated jamming signal on line 11. In an alternative embodiment, the FM modulation is done in the FPGA 41 using digital signal processing techniques.

The power level of the amplification in the amplifiers 33 and 34 determines the effective range of the jammer 1. In one embodiment, the preamplifier 33 has a gain of about 20 dB and the power amplifier 34 has about 50 dB of gain. For an amplified high power (>10 Watts), the effective range is greater than 36 m. The range is extended when the power is increased. For a 100m effective range, a power output of about 50 watts is employed.

The RF generated jamming signal on line 11 from amplifiers 33 and 34 is input to switch 12. The switch 12 connects in position 12-1 to connect the RF generated jamming signal to line 13 and the antenna 6 for transmission to the in-range receivers such as receivers $R_1$, $R_2$, $R_4$ and $R_T$ in FIG. 2. Switch 12 is actuated to the 12-1 position for connecting the generated signals on line 11 to transmit through antenna 6 or is actuated to the position 12-2 to connect signals received from local transmitters by antenna 6 line 14 connecting to the receive-unit 4. Such connection to the receive-unit 4 occurs, referring to FIG. 4, during the time when signals are received, that is, from 0.5 to 1 msec and again from 28 to 28.5 msec. During these receive times, the high power jamming transmitted signals from the transmit-unit 2 are blocked by switch 12 from being output to antennas 6 and hence do not interfere with the reception by antenna 6 of local transmitter signals.

The switch 12 typically has about 50 dB of isolation from the transmit path 12-1 to the receive path 12-2 when the switch is in the Rx position 12-2. While this isolation is adequate for some applications, the preamplifier 33 gain of 20 dB and the power amplifier gain of 45 dB increase the switch leakage to the point where switch 12 can present a significant problem for operation at the high power end of the power range. To increase isolation, a second switch 54 is inserted in the path between the power amplifier 34 and the switch 12 providing an additional 50 dB of isolation.

The switch 12 is under control of the FPGA 41 which produces a TTL (Transistor-Transistor Logic) logic 1 or logic 0 signal on line 45 that is logic 1 when the signal is being played back (for M seconds) during the ON PB "M" period and logic 0 when the signal is not being played during the OFF "P" periods (for P seconds) and during the REC "N" periods (for N seconds). This signal on line 45 is used to drive the switch 12 with a logic 1 for the transmit path 12-1 and logic 0 for the receive path 12-2. This operation means that the FPGA 41 when not producing a signal during the OFF "P" periods also controls the switch 12 to be in the receive mode with 12-2 selected so that no transmission occurs during the OFF "P" periods. Since a substantial amount of noise can exist during the OFF "P" periods, preventing transmission of that noise is important.

In FIG. 3, the generated signals on line 10, in the form of chopped signals, are up converted to RF jammer transmitter signals with the inserted FM modulation on line 11 and are connected through switch 12, in the 12-1 position, to line 13 and antenna 6 for RF transmission to local receivers. The RF jammer transmitter signals include an analog algorithm, in the form of FM modulation, for preventing local receivers from receiving analog signals and include a digital algorithm, in the form of chopped regenerated signals, for preventing local receivers from receiving digital signals. Together the multiple analog and digital jamming signals have proved in actual practice to perform extraordinarily well and have been able to reliably jam receivers that have heretofore been not been readily jammed.

The generated signals on line 10 are up converted to RF jammer transmitter signals on line 11 and are connected through switch 12 in the 12-1 position to line 13 and antenna 6 for RF transmission to local receivers.

Figure 5:
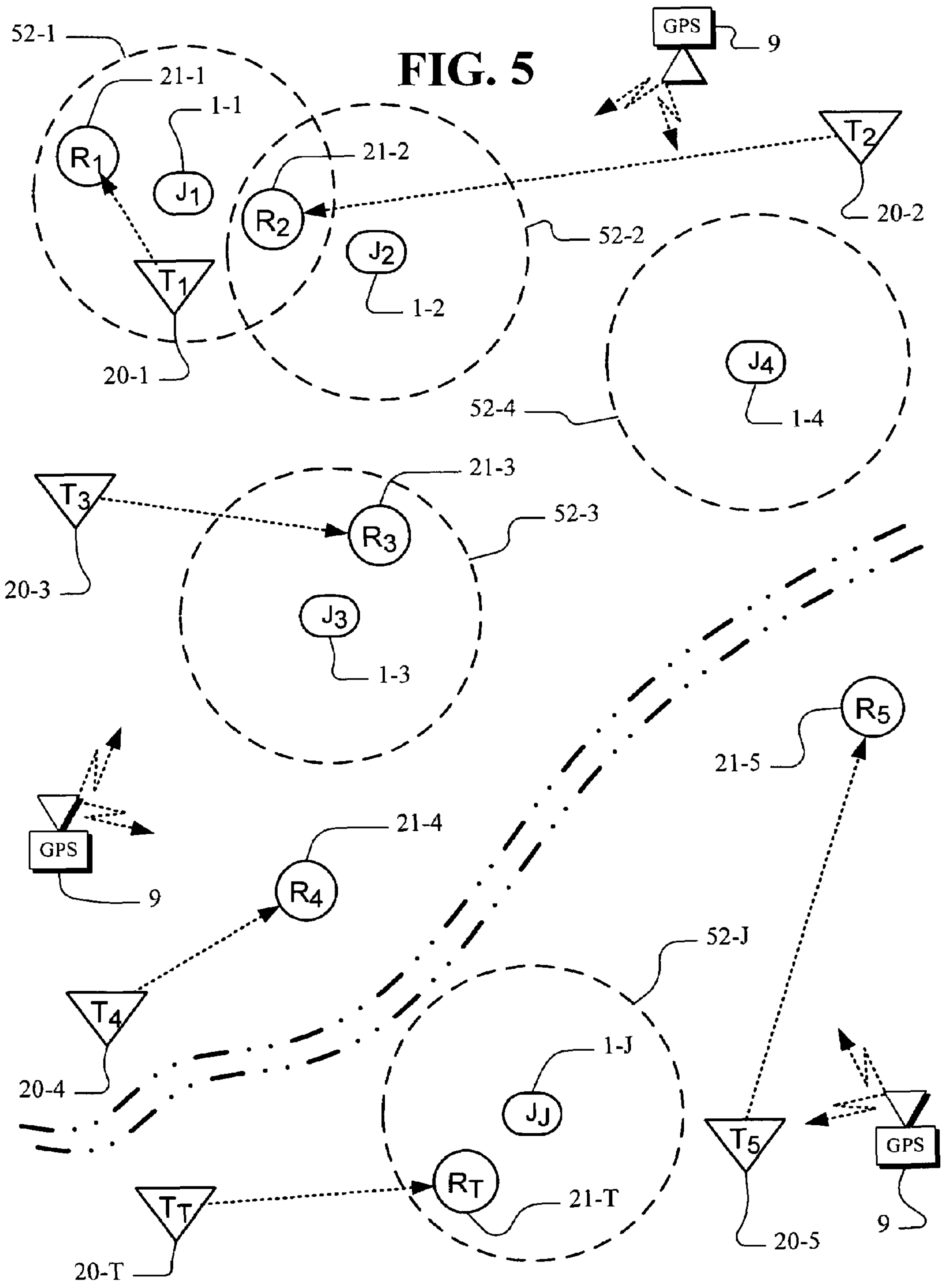
FIG. 5 depicts a region populated by multiple jammers of the FIG. 3 type with multiple local transmitters and local receivers that are within multiple local areas covered by the RF radiation ranges of multiple jammers.

In FIG. 5, a plurality of jammers $J_1$, $J_2$, $J_3$, $J_4$, . . . , $J_{Jj}$ designated 1-1, 1-2, 1-3, 1-4, . . . , 1-J, respectively, are depicted where each of those jammers is like the jammer 1 of FIG. 1. Each of the jammers $J_1$, $J_2$, $J_3$, $J_4$, . . . , $J_{Jj}$ is located in a local region 52-1, 52-2, 52-3, 52-4, . . . , 52-J, respectively, where each local region is defined by the effective jamming range DJ of each jammer. For purposes of explanation, each jamming range is assumed to be equal and in one example is 100m. Each of the local regions 52-1, 52-2, 52-3, 52-4, . . . , 52-J may have one or more RF local transmitters $T_1$, $T_2$, . . . , $T_T$ and/or one or more RF local receivers $R_1$, $R_2$, . . . , $R_T$ where typically, the local transmitters $T_1$, $T_2$, . . . , $T_T$ have RF transmissions to the local receivers $R_1$, $R_2$, . . . , $R_T$, respectively. However, in some instances, a local transmitter can transmit to two or more local receivers.

In FIG. 5, the receivers $R_1$ and $R_2$ are within the 100m effective jamming range of the jammer $J_1$ in local region 52-1. The receiver $R_2$ is within the 100m effective jamming range of the jammer $J_2$ in local region 52-2. The local regions 52-1 and 52-2 partially overlap. The receiver $R_3$ is within the 100m effective jamming range of the jammer $J_3$ in local region 52-3. The receiver $R_T$ is within the 100m effective jamming range of the jammer $J_J$ in local region 52-J.

The local transmitters $T_1$, $T_2$, $T_3$, $T_4$, $T_5$, . . . , $T_T$ are located within the greater region of FIG. 5 including all the local regions 52-1, 52-2, 52-3, 52-4, . . . , 52-J and including other regions, and the local transmitters transmit RF signals to the local receivers $R_1$, $R_2$, $R_3$, $R_4$, $R_5$, . . . , $R_T$, respectively.

In FIG. 5, a GPS signals are transmitted by the GPS transmitters 9 that are part of the worldwide GPS satellite network. GPS receivers in each jammer 1 receive the signals from the satellite network and produce at each receiver a latitude/longitude/altitude position, a 10 MHz reference signal and a 1 PPS (pulse per second) signal. All GPS receivers on the earth, including the GPS receivers in the jammers of FIG. 5, produce exactly the same synchronized 1 PPS signal. Each GPS receiver in the jammers of FIG. 5 receives the transmitted signals from multiple ones of the GPS satellite transmitters 9.

The GPS receivers in each of the jammers $J_1$, $J_2$, $J_3$, $J_4$, . . . , $J_{Jj}$ is typically a special, active antenna capable of receiving the very weak signals from the satellite transmitters 9 in space. The antenna unit 6 generally does not act as the GPS receiver since it is typically passive and may not be in the same frequency range as GPS where GPS uses 1200-1600 MHz signals. Typically no signals of interest to jam occur in this band. Also, since GPS receivers need to receive the weak GPS signals at all times, the use of an antenna unit 6 with the high power transmitted signals would tend to corrupt the GPS operation.

In FPGA 41, a jammer synchronization algorithm uses the GPS 1 PPS signal for synchronization. The 1 PPS synchronization signal is recognized and processed to synchronize the non-transmission period of the jamming transmissions from each jammer with the non-transmission period of the jamming transmissions for each other jammer in the region. The synchronization algorithm that relies on the GPS 1 PPS signal is one of the algorithms 7 of FIG. 1.

Figure 6:
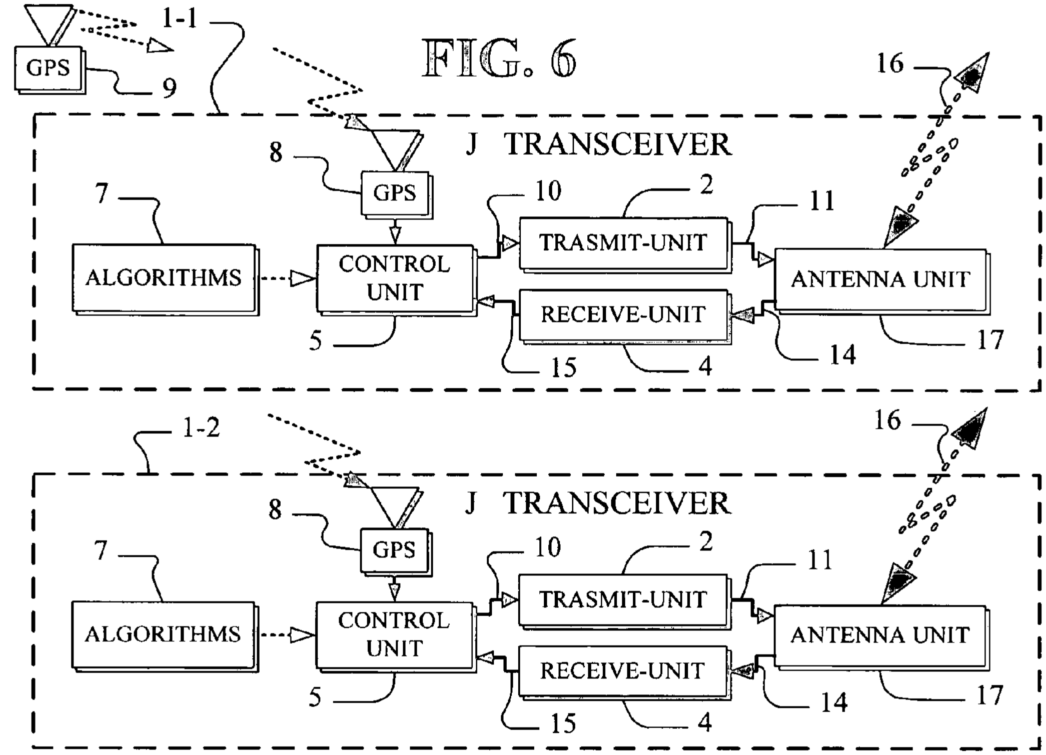
FIG. 6 depicts a schematic block diagram of two multiple-algorithm jammers of the FIG. 1 type having GPS (Global Positioning System) receivers for synchronized operation.

In FIG. 6, the multiple-algorithm jammers 1-1 and 1-2 are of the FIG. 1 type and have separate GPS receivers 8 for synchronized operation. In FIG. 6, the regenerative jammers 1-1 and 1-2 each includes a broadband transmit-unit 2, a broadband receive-unit 4 and a broadband antenna unit 17. A control unit 5 controls the transmit-unit 2 and the receive-unit 4 to receive and process RF transmissions from local RF transmitters and to generate and transmit jammer signals to local RF receivers through antenna unit 17. The control unit 5 implements multiple algorithms 7. In one embodiment, the signals from transmitters in the local areas of the jammers 1-1 and 1-2 are each recorded, the recorded signals are chopped and repeated and the chopped and repeated signals are FM modulated. Each of the GPS receivers 8 receives a broadcast GPS signal from GPS transmitters 9 and uses the received GPS signals to synchronize the jamming signals with the 1 PPS GPS jammer synchronization signal.

Figure 7:
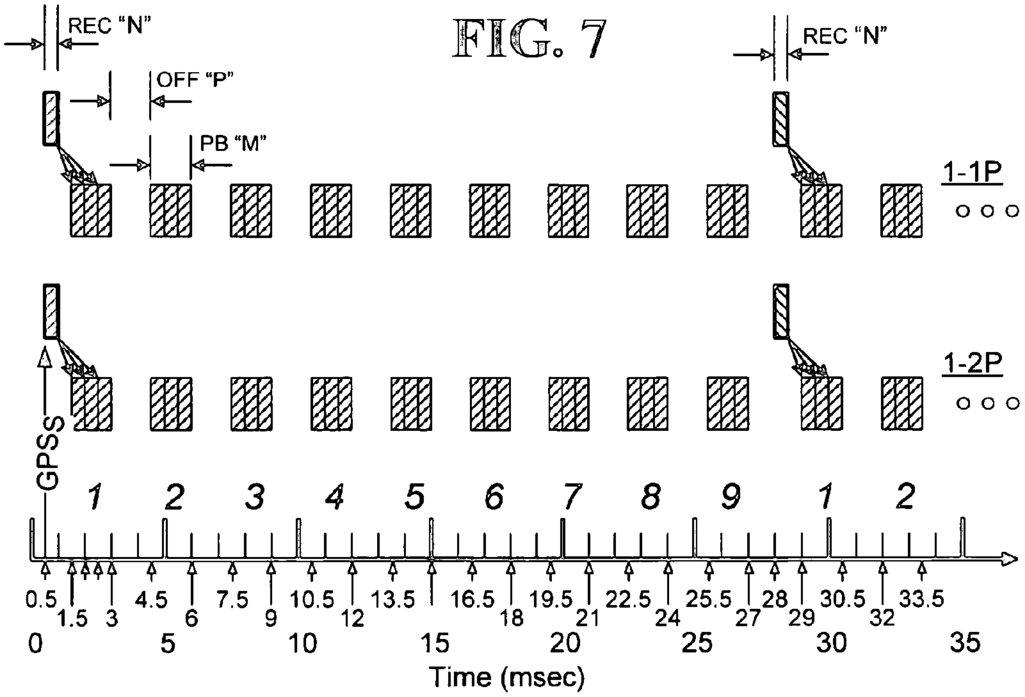
FIG. 7 depicts representative synchronized digital patterns of the chopped regenerated jamming signals produced by the jammers of FIG. 6.

FIG. 7 depicts representative synchronized digital patterns 1-1P and 1-2P of the chopped regenerated jamming signals produced by the jammers of FIG. 6. The GPS signal transmitted by the GPS transmitter 9 has a frequency of 1 pulse per second. The GPS signal is received by each of the GPS receivers 8 and is processed (for example in the FPGA 41 of FIG. 1) to generate a synchronizing signal, $GPS_S$, that synchronizes the OFF time P the same for both the digital patterns 1-1P and 1-2P. Second and subsequent synchronizing signals, $GPS_S$, occur at the one second intervals of the GPS signal transmitted by the GPS transmitter 9. Since both jammers 1-1 and 1-2 coordinate their OFF times from the transmitted GPS signal, each of the jammers 1-1 and 1-2 monitors and records data when the jammer transmitters have their transmissions OFF. The jammer synchronization of the jammers 1-1 and 1-2 of FIG. 6 is, of course, extended to all the jammers in a region such as the jammers $J_1$, $J_2$, $J_3$, $J_4$, . . . , $J_{Jj}$ (designated 1-1, 1-2, 1-3, 1-4, . . . , 1-J, respectively) in FIG. 5.

While the synchronizing of the jammers $J_1$, $J_2$, $J_3$, $J_4$, . . . , $J_{Jj}$ in FIG. 5 in one preferred embodiment employs GPS signals, other jammer synchronization embodiments are also possible. For example, one or more of the jammers 1 of FIG. 5 can be a master synchronizer that broadcasts a local jammer synchronization signal similar to the GPS signal and all other jammers use the broadcast local jammer synchronization signal to synchronize in the same manner as is done with the GPS jammer synchronization signal.

Figure 8:
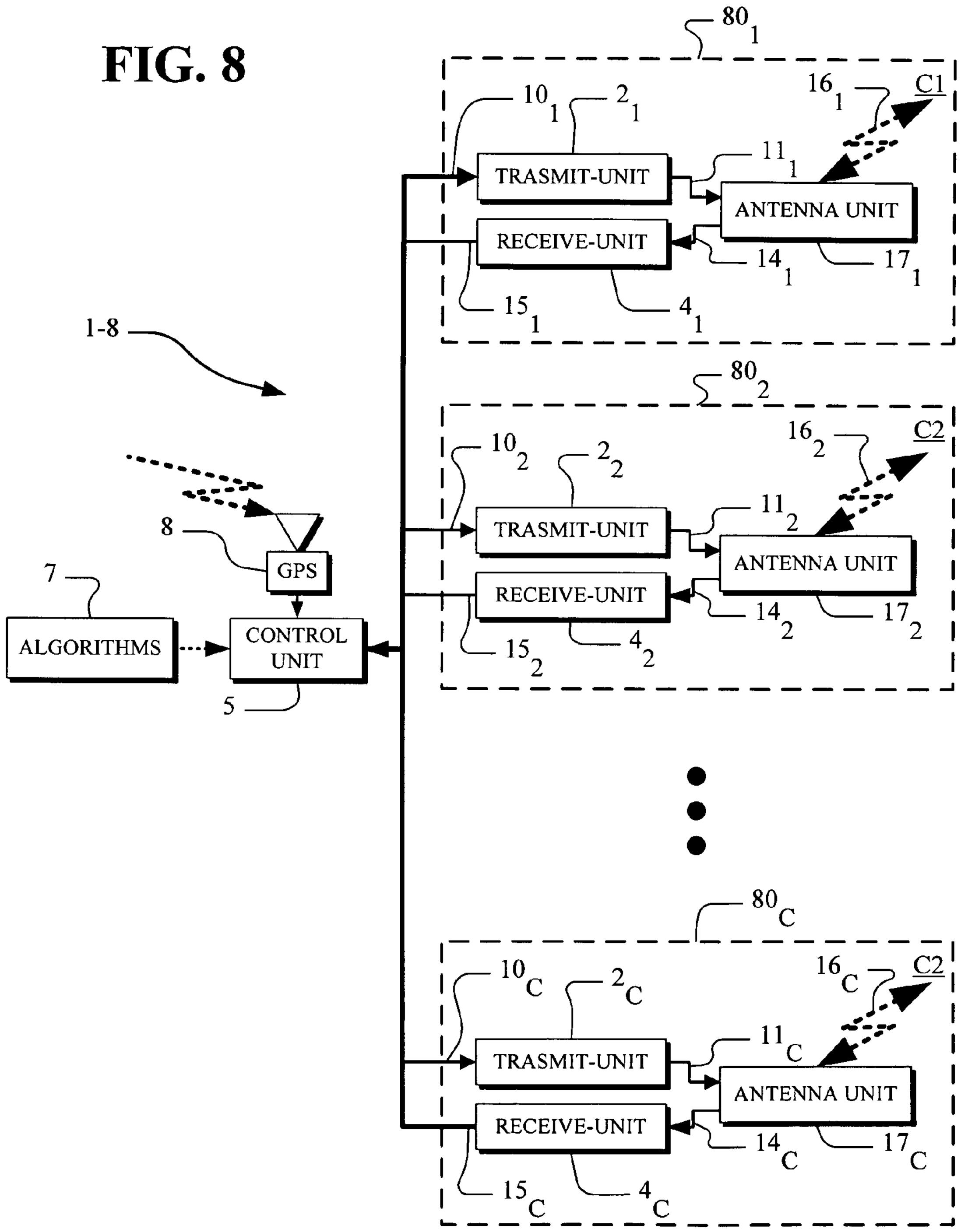
FIG. 8 depicts a schematic block diagram of a multiple-algorithm jammer of the FIG. 1 type having multiple channels.

In FIG. 8, a schematic block diagram of a multiple-algorithm jammer 1-8 of the FIG. 1 type has multiple channels for jamming over a broad range of frequency bands at the same time. While the jammer 1 of FIG. 3 employs a single channel, the jammer 1-8 of FIG. 8 employs multiple channels C1, C2, . . . , CC, as many channels as are needed for the frequency environment in any particular region.

In FIG. 8, the regenerative jammer 1-8 includes a plurality of channel units 80 including the channel units $\mathbf{80}_1$, $\mathbf{80}_2$, . . . , $\mathbf{80}_C$, for the channels C1, C2, . . . , CC, respectively. Each of the channel units 80 includes an transmit-unit 2, a receive-unit 4 and an antenna unit 17 like those described in connection with FIG. 1 and FIG. 3. Specifically, channel unit $\mathbf{80}_1$ includes an transmit-unit $\mathbf{2}_1$ a receive-unit $\mathbf{4}_1$ and an antenna unit $\mathbf{17}_1$; channel unit $\mathbf{80}_2$ includes an transmit-unit $\mathbf{2}_2$, a receive-unit $\mathbf{4}_2$ and an antenna unit $\mathbf{17}_2$; and channel unit $\mathbf{80}_C$ includes an transmit-unit $\mathbf{2}_C$, a receive-unit $\mathbf{4}_C$ and an antenna unit $\mathbf{17}_C$.

While separate antenna units 17 and specifically $\mathbf{17}_1$, $\mathbf{17}_2$, . . . , $\mathbf{17}_C$ have been shown in FIG. 8, one or more antenna units 17 can be combined to share common antennas among channel units 80. While conceptually transmit-units or receive-units can similarly be shared, the limitations of power amplifiers make such sharing more difficult. For example, a practical power amplifier, like power amplifier 34 in FIG. 3, can function from 20-1000 MHz such an amplifier usually does not perform adequately above 1000 MHz. A power amplifier operating above 1000 MHz typically covers the range from 1000-2000 MHz. With such constraints, the jammer 1-8 of FIG. 8, in a typical embodiment, uses two or more channels to cover the full range, that is, one or more channels, such as channel C1, covers the 20-1000 MHz band and another one or more channels, such as channel C2, covers the band above 1000 MHz. In such an embodiment, the channel units $\mathbf{80}_1$ and $\mathbf{80}_2$ and the channels C1 and C2 are controlled to operate over the 20-1000 MHz band and the band above 1000 MHz, respectively.

In FIG. 8, the control unit 5 controls the transmit-units 2 and the receive-units 4 for each of the channels C1, C2, . . . , CC to receive and process RF transmissions from local RF transmitters and to generate and transmit jammer signals to local RF receivers through the antenna units 17. The control unit 5 implements multiple control algorithms 7 for each of the channel units $80_1$, $80_2$, . . . , $80_C$. In operation for each of the channels C1, C2, . . . , CC, the signals from transmitters in the local areas of the jammer 1-8 are each recorded, the recorded signals are chopped and repeated and the chopped and repeated signals are FM modulated.

In the FIG. 8 embodiment, the signal processing in the control unit 5 for all of the channel units $80_1$, $80_2$, . . . , $80_C$. is realized in a single FPGA chip (similar to the FPGA 41 of FIG. 3) with multiple input and output ports is employed. In alternate embodiments, a plurality of different FPGA chips is employed with potentially a different FPGA chip, or equivalent, for each channel C1, C2, . . . , CC.

In FIG. 8, the GPS receiver 8 receives a broadcast GPS signal from a GPS transmitter 9 (see FIG. 5, for example) and uses the received GPS signal to synchronize the OFF time of the jamming signals for each of the channels C1, C2, . . . , CC.

In some embodiments, it is desired to permit some un-jammed communications. For example, the users of jammers might need to communicate with each other, TV or FM radio broadcasts might be permitted to operate un-jammed, and police, fire and other emergency services are usually allowed to operate un-jammed.

In order to allow un-jammed communications, the channel algorithm 7-Y of FIG. 1 is a notch filter algorithm that provides for un-jammed communications at selected frequencies in the jamming region. In one embodiment, the JAM 4 algorithm of FIG. 1 is a notch filter algorithm that creates one or more "notches" in the frequency band that permit wanted communications to occur within the notch frequencies.

This notch filter algorithm is typically a digital Finite Impulse Response (FIR) filter or a digital Infinite Impulse Response Filter (IIR) filter. The system operator for manual operation or automatic controls for automatic operation enter the frequencies and bandwidths of the allowed communications signals into the control unit 5 and the FPGA. Typically, the computer 42 (see FIG. 3) computes the digital filter coefficients and downloads them into the appropriate FPGA.

Figure 9:
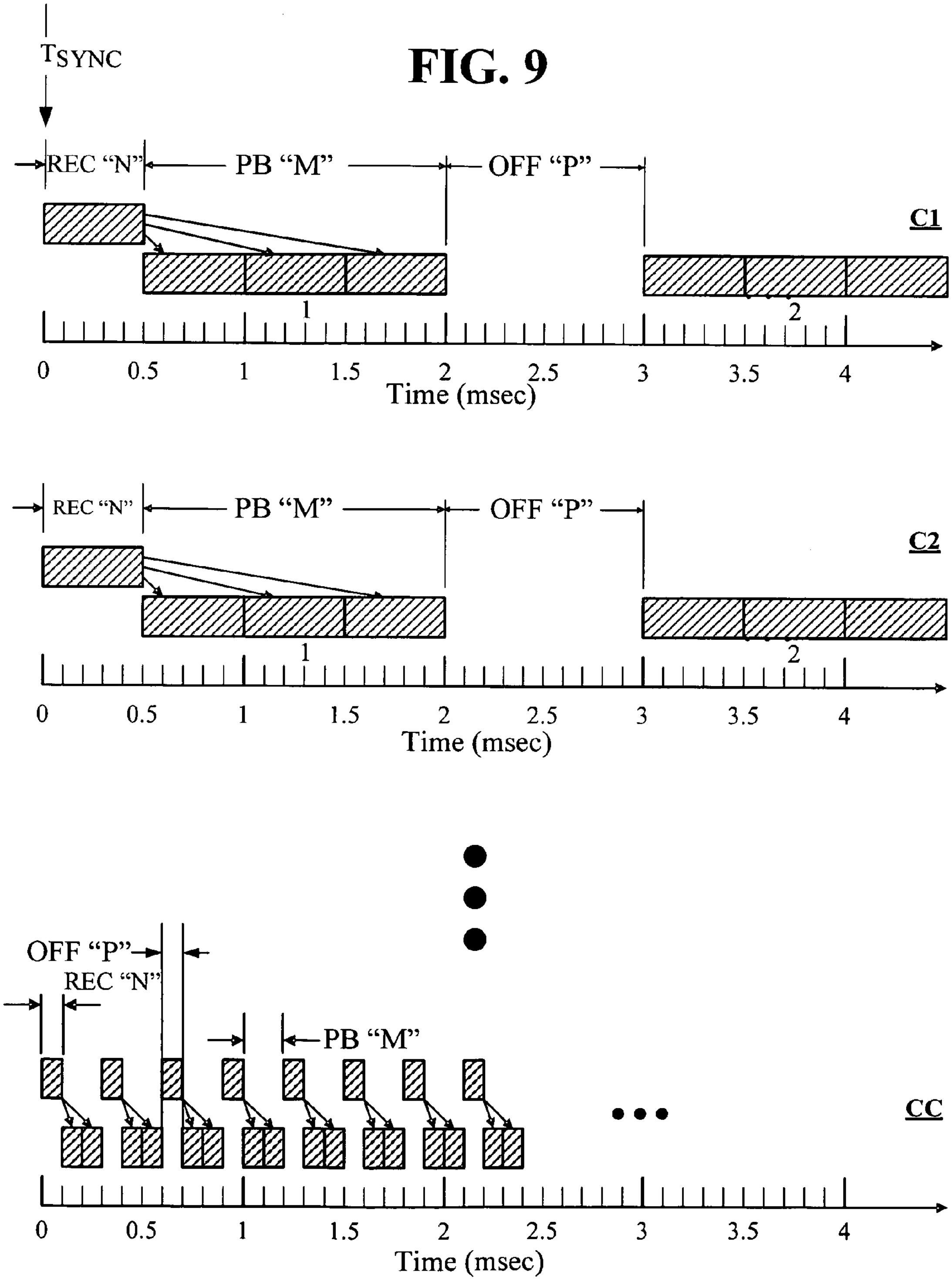
FIG. 9 depicts representative digital patterns of the chopped regenerated jamming signals produced by the jammer of FIG. 8.

FIG. 9 depicts representative digital patterns of the chopped regenerated jamming signals produced by the jammer of FIG. 8. FIG. 9 shows two jammer channels with timing set to be effective against slow rate or analog signals. The bottom part of FIG. 9 shows a jammer channel with algorithm timing to be effective against high rate digital signals, for example, GSM signals.

Figure 10:
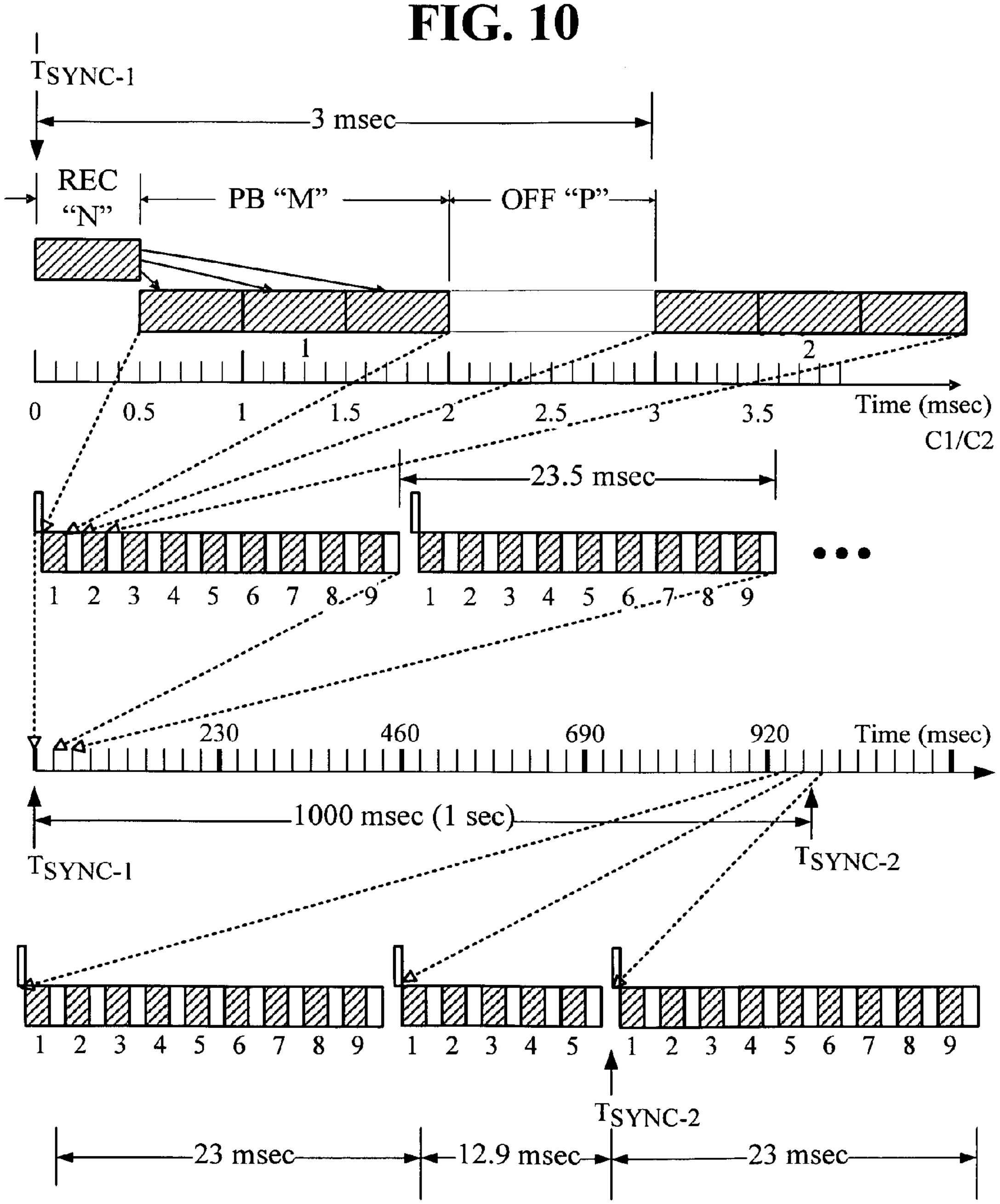
FIG. 10 depicts signals representing the synchronization of jammers operating in the manner of the C1 and C2 channels of FIG. 9.

FIG. 10 depicts signals representing the synchronization of jammers operating in the manner of the C1 and C2 channels of FIG. 9. At t=0 time, the $T_{SYNC\text{-}1}$ jammer synchronization signal occurs in response to a synchronization source such as a GPS transmitter. Upon receipt of the jammer synchronization signal, all jammers in a region (for example, the jammers 1-1, 1-2, . . . , 1-J in FIG. 5) stop transmissions of jamming signals. During a 0.5 msec record period (N=0.5), each jammer receives and records a sample of the local transmissions occurring in the region. That recorded sample is processed to form a generated jamming signal and the jamming signal is transmitted three times during the playback M period. After the M playback period, the jamming signal is then turned OFF (chopped) and remains OFF for one msec during the P period. At t=3, a second burst of three occurs for another playback M period. This ON and OFF sequence of an M playback period followed by a P period is repeated until a total of nine burst playbacks R have occurred. Each sequence of nine is followed by a new 0.5 msec recording followed by another nine playbacks. Each sequence of nine M/P periods followed by an OFF time of 0.5 msec and an N record period of 0.5 msec has a duration of 23.5 msec in the example shown. The 23.5 msec period is repeated until a new jammer synchronization pulse, $T_{SYNC\text{-}2}$, is received. The jammer synchronization pulse, $T_{SYNC\text{-}2}$, occurs one second after the first jammer synchronization pulse, $T_{SYNC\text{-}1}$. The jammer synchronization pulse, $T_{SYNC\text{-}2}$, arrives after the forty-second sequences of nine ON/OFF periods and arrives nominally one-half way through (approximately 12.9 msec) the forty-third M/P sequence of nine. If there has been any drift in the timing of the pulses, from one jammer to another, the jammer synchronizing pulses reset all the jammers so that they all have the same OFF condition when recordings are made (during the REC "N" periods) of the local transmission signals.

Figure 11:
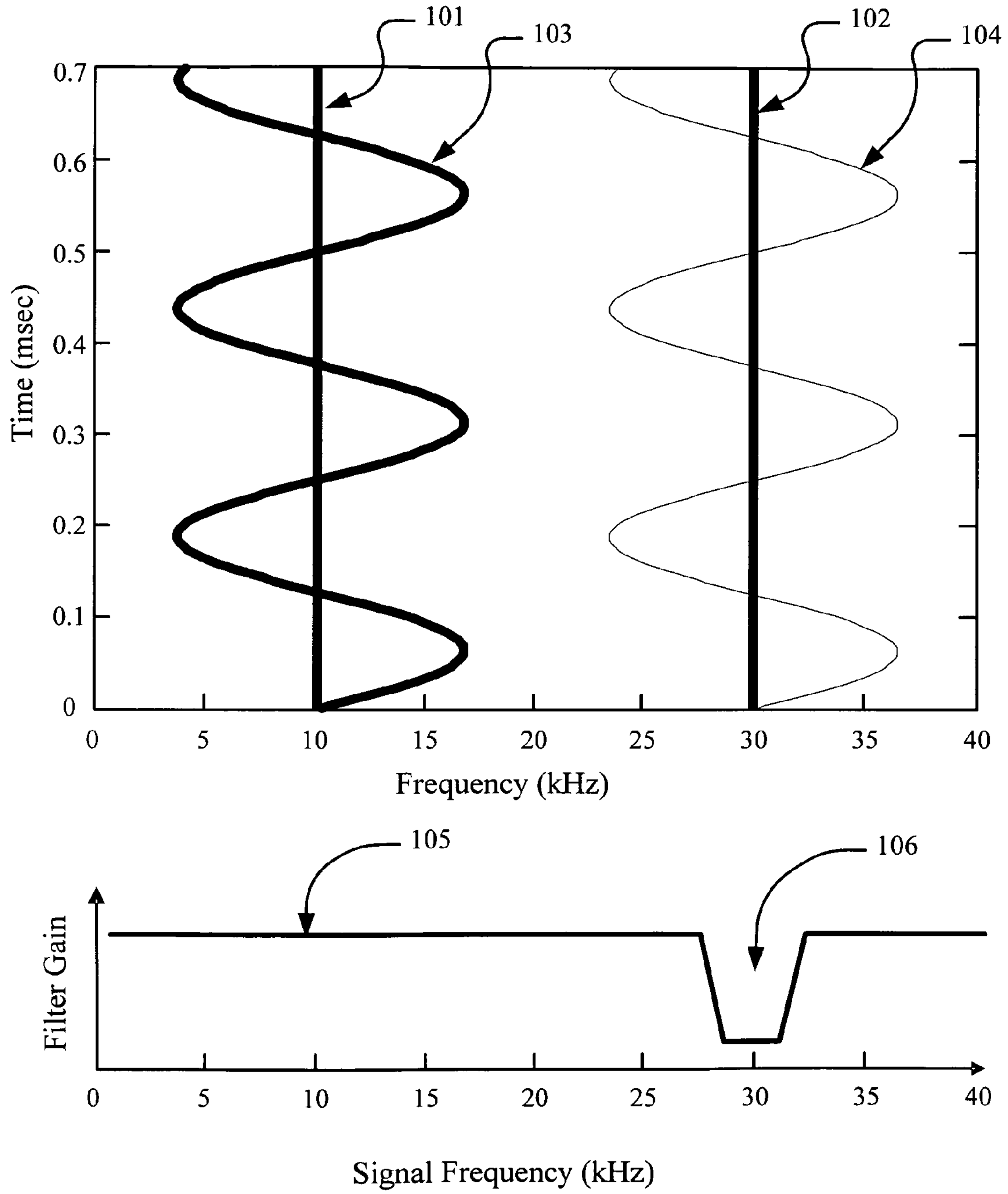
FIG. 11 depicts a spectrogram plot of two communications signal and their associated jamming signals. This also shows the functionality of a FIR filter to prevent jamming of one signal.

FIG. 11 shows a spectrogram of two communications signals, 101 and 102 from local transmitters (for example, T1 and T2 in FIG. 5). It is desired to jam signal 101 which has a 10 kHz frequency. The jammer 1 of FIG. 3 samples, regenerates and FM modulates the signal 101 for playback. In an embodiment where chopping is also performed, the chopping is not visible in FIG. 11 because the particular portion of the signal 101 shown is not occurring during the chopping portion of operation. The playback jamming signal component 103 is a sinusoidally FM modulated signal that has relatively high energy as indicated by the thickness of the waveform 103 in FIG. 11. In FIG. 11, the signal 102 at a frequency of 30 kHz, has been identified as a local transmitter signal that is not to be jammed. A notch filter 106 effectively excludes the 30 kHz frequency from having a large amount of energy in the generated jamming signal. Accordingly the jamming signal component 104 has relatively low energy (not sufficient energy to cause jamming) as represented by a very thin almost not observable line in FIG. 11. The notch as indicated in FIG. 11 and as implemented by the jamming algorithm 4 of FIG. 1 has been placed to filter out signal 102 from the signal 15 into FPGA 41 of FIG. 3. The filter greatly attenuates the signal 102 so the resultant associated jammer signal 104 is greatly attenuated and will not be effective at jamming the signal 102.

Figure 12:
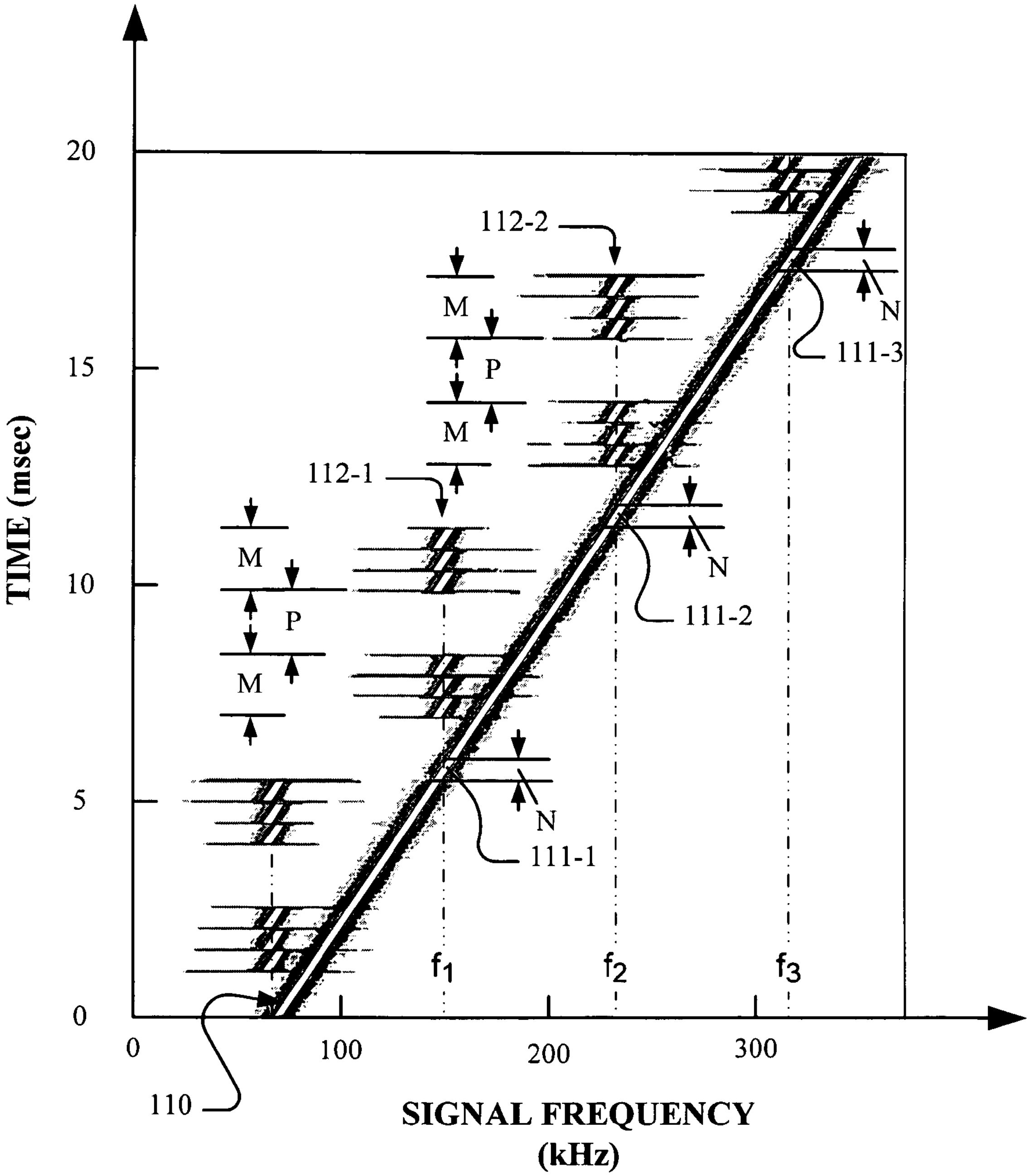
FIG. 12 shows regenerated chopped jamming signals derived from a linear chirp signal where the frequency of the chirp signal changes at a constant rate over time.

In FIG. 12, a linear chirp signal 110 being transmitted by a local transmitter (T1 in FIG. 5, for example) is shown which increases at a constant rate of 20 MHz/sec. The chirp signal 110 is detected by a jammer 1 (jammer 1-1 in FIG. 5, for example) The jammer 1 includes a receive unit 4 (see FIG. 1, for example) and a control unit 5 (see control unit 5 in FIG. 1, for example). The control unit 5 processes the received chirp signal 110 using a combination of the regeneration and chopping algorithms as previously described in connection with FIG. 4 and TABLE 2. The jamming signal formed is transmitted through operation of the transmit unit 2 and antenna unit 17 (see FIG. 1, for example).

In FIG. 12, the values of N, M, P and R are as set forth in the following TABLE 4:

TABLE 4

| | | |
|---|---|---|
| N | Record Period | 0.5 msec |
| M | Playback Period | 1.5 msec |
| P | OFF Period | 1.5 msec |
| R | Burst Playback Number | 2 |

The processing to generate the chopped jamming signal from the chirp signal 110 is a continuous process occurring before and after the segment of the chirp signal 110 shown. Samples 111-1, 111-2 and 111-3 of the chirp signal 110 are recorded for the N .0.5 msec sample periods at the $f_1$, $f_2$ and $f_3$ frequencies. Each of these samples is regenerated two times (R=2) as a burst that includes three samples during the two M playback periods separated by a P OFF period. The samples 111-1 and 111-2, by way of example, result in the bursts 112-1 and 112-2, each burst including therefore result in the three samples during the two M playback periods separated by a P OFF period.

While the invention has been particularly shown and described with reference to preferred embodiments thereof it will be understood by those skilled in the art that various changes in form and details may be made therein without departing from the scope of the invention.

What is claimed is:

1. A jammer for controlling RF transmission in a local area, where the local area may have at least one transmitter and at least one transmitter and where the local transmitters transmit local RF transmissions to the local receivers comprising:

an antenna unit for receiving jammer received signals from the RF transmissions of local transmitters and for transmission of RF jammer transmitter signals to the local receivers, a receive-unit for converting the jammer received signals to form converted received signals, a transmit-unit for converting generated signals to form the RF jammer transmitter signals, a control unit operating with a plurality of control algorithms including, a regeneration algorithm operating with a regeneration sequence including, turning off the jammer transmitter signals and enabling receipt of the jammer received signals during a non-transmit period, recording a sample of the jammer received signals during a record period of duration N occurring during said non-transmit period, playing back said sample to form a playback signal, at least one alternation algorithm operating to alter said playback signal to generate said generated signals asynchronously with respect to ones of said jammer received signals whereby timing characteristics of the RF jammer transmitter signals are independent of timing characteristics of said jammer received signals.

2. The jammer of claim 1 wherein, said alteration algorithms include a chopping algorithm characterized by, an ON/OFF sequence including an ON period of duration M for playing back said sample of duration N one or more times and including an OFF period of duration P following said ON period of duration M, and forming a chopped regenerated signal as said ON/OFF sequence played a number of times, R, and wherein said regeneration algorithm and said chopping algorithm are continuously repeated to form said generated signals.

3. The jammer of claim 1 wherein alteration algorithm is an FM algorithm for FM modulating said generated signals.

4. The jammer of claim 1 wherein, said alteration algorithms include a chopping algorithm characterized by, an ON/OFF sequence including an ON period of duration M for playing back said sample of duration N one or more times and including an OFF period of duration P following said ON period of duration M, and forming a chopped regenerated signal as said ON/OFF sequence played a number of times, R, said alteration algorithms include an FM algorithm characterized by, FM modulating the chopped regenerated signal, and wherein said regeneration algorithm, said chopping algorithm and said FM algorithm are continuously repeated to form said generated signals.

5. The jammer of claim 1 wherein said transmit-unit includes a local oscillator for shifting from a lower frequency for the generated signals to a higher frequency for the RF jammer transmitter signals and wherein said control unit includes an FM signal generator connected to said local oscillator for FM modulating the RF jammer transmitter signals.

6. The jammer of claim 5 wherein said FM signal generator provides FM modulation energy in demodulated frequency bands.

7. The jammer of claim 6 wherein said demodulated frequency bands include a 1 to 3 kHz band and a 5 to 7 kHz band.

8. The jammer of claim 1 wherein, said receive-unit includes one or more broadband amplifiers, an RF down-converter and an A/D converter, said transmit-unit includes a D/A converter, an RF up-converter and one or more amplifiers, said control unit includes a digital logic unit for controlling the regeneration algorithm and the alteration algorithms.

9. The jammer of claim 8 wherein said digital logic unit is a programmable gate array.

10. The jammer of claim 8 wherein said digital logic includes a programmable gate array and includes a computer processor for loading values of N, M, P and R into said programmable gate array.

11. The jammer of claim 1 wherein said control unit responds to jammer synchronizing signals to initiate the non-transmit periods periodically.

12. The jammer of claim 11 wherein said local region receives broadcast jammer synchronization signals from synchronizing GPS transmitters and wherein said synchronizing signal is derived from said GPS signals.

13. The jammer of claim 1 including a plurality of channel units providing a plurality of channels, each channel unit including a channel transmit-unit and a channel receive-unit.

14. The jammer of claim 13 wherein one of more of said channels are for a 20-1000 MHz band and wherein one or more other ones of said channels are for a band above 1000 MHz.

15. The jammer of claim 13 wherein one or more of said channel units uses a first set of said control algorithms and one or more of different ones of said channel units uses a second set of said control algorithms where said second set is different from said first set.

16. The jammer of claim 1 wherein said control algorithms include a digital filter algorithm for providing channel notches that permit un-jammed operation of wanted signals in the channel notches.

17. The jammer of claim 16 wherein said digital filter algorithm is a Finite Impulse Response (FIR) filter or an Infinite Impulse Response Filter (IIR) filter.

18. A jamming system having a plurality of jammers for controlling RF transmission in a local area where the local area receives broadcast jammer synchronization signals from synchronizing transmitters, where the local area has at least one transmitter and at least one transmitter and where the local transmitters transmit local RF transmissions to the local receivers comprising:

each of said jammers including:

a broadband antenna unit for receiving jammer received signals from the RF transmissions of local transmitters and for transmission of RF jammer transmitter signals to the local receivers, a broadband receive-unit including an A/D converter for converting the jammer received signals to form converted received signals, a broadband transmit-unit including a D/A converter for converting generated signals to form the RF jammer transmitter signals, a control unit operating with a plurality of control algorithms including, a regeneration algorithm operating with a regeneration sequence including, turning off the jammer transmitter signals and enabling receipt of the jammer received signals during a non-transmit period, recording a sample of the jammer received signals during a record period N occurring during said non-transmit period, playing back said sample to form a playback signal, an alteration algorithm operating to alter said playback signal to generate said generated signals asynchronously with respect to ones of said jammer received signals whereby timing characteristics of the RF jammer transmitter signals are independent of timing characteristics of said jammer received signals;

a synchronization receiver for receiving the broadcast jammer synchronization signals and providing a received synchronization signal to said control unit for periodically synchronizing said non-transmission period.

19. The jammer of claim 18 wherein, said alteration algorithms include a chopping algorithm characterized by, an ON/OFF sequence including an ON period of duration M for playing back said sample of duration N one or more times and including an OFF period of duration P following said ON period of duration M, and forming a chopped regenerated signal as said ON/OFF sequence played a number of times, R, and wherein said regeneration algorithm and said chopping algorithm are continuously repeated to form said generated signals.

20. The jammer of claim 18 wherein alteration algorithms include an FM algorithm for FM modulating said generated signals.

21. The jammer of claim 18 wherein, said alteration algorithms include a chopping algorithm characterized by, an ON/OFF sequence including an ON period of duration M for playing back said sample of duration N one or more times and including an OFF period of duration P following said ON period of duration M, and forming a chopped regenerated signal as said ON/OFF sequence played a number of times, R, said alteration algorithms include an FM algorithm characterized by, FM modulating the chopped regenerated signal, and wherein said regeneration algorithm, said chopping algorithm and said FM algorithm are continuously repeated to form said generated signals.

22. The jamming system of claim 18 wherein said synchronization signals are GPS signals.

23. The jamming system of claim 18 wherein said synchronization signals include a local synchronization signal generated by one of said jammers.

24. A method of jamming RF transmission in a local area, where the local area may have at least one transmitter and at least one transmitter and where the local transmitters transmit local RF transmissions to the local receivers comprising:

receiving jammer received signals from the RF transmissions of local transmitters and transmitting RF jammer transmitter signals to the local receivers, converting the jammer received signals to form converted received signals, converting generated signals to form the RF jammer transmitter signals, controlling operation with a plurality of control algorithms including, a regeneration algorithm operating with a regeneration sequence including, turning off the jammer transmitter signals and enabling receipt of the jammer received signals during a non-transmit period, recording a sample of the jammer received signals during a record period N occurring during said non-transmit period, playing back said sample to form a playback signal, an alteration algorithm operating to alter said playback signal to generate said generated signals asynchronously with respect to ones of said jammer received signals whereby timing characteristics of the RF jammer transmitter signals are independent of timing characteristics of said jammer received signals.

25. The method of claim 24 wherein, said alteration algorithms include a chopping algorithm characterized by, an ON/OFF sequence including an ON period of duration M for playing back said sample of duration N one or more times and including an OFF period of duration P following said ON period of duration M, and forming a chopped regenerated signal as said ON/OFF sequence played a number of times, R, said alteration algorithms include an FM algorithm characterized by, FM modulating the chopped regenerated signal, and wherein said regeneration algorithm, said chopping algorithm and said FM algorithm are continuously repeated to form said generated signals.

* * * * *